G. MEADER.
Field Corn-Huskers.

No. 199,376. Patented Jan. 22, 1878.

Attest.,
W. C. Corlies
L. A. Bunting

Inventor,
George Meader,
By Lewis L. Coburn
Attys.

UNITED STATES PATENT OFFICE.

GEORGE MEADER, OF PRAIRIE CENTRE, ILLINOIS.

IMPROVEMENT IN FIELD CORN-HUSKERS.

Specification forming part of Letters Patent No. 199,376, dated January 22, 1878; application filed May 18, 1877.

*To all whom it may concern:*

Be it known that I, GEORGE MEADER, of Prairie Centre, in the county of La Salle and State of Illinois, have invented a Field Corn-Husker, of which the following is a specification, reference being had to the accompanying drawings, which form a part hereof.

The object of my invention is to improve upon my patent of December 13, 1870, by more effectually gathering the corn to the husking-rollers; to provide a gage-board, by which the corn is thrown over upon one of the rollers, and prevented from being carried down between the rollers and shelled while the husk is being stripped from it; to provide for an adjustment of the machine, so that the gatherer and the front end of the husking-rollers can be raised to a greater or less distance from the ground; and also so combining the frame and draft that the team straddles the row of corn which is being husked, and gives the machine a center draft. At the same time the draft is applied to the machine at the rear of the frame in such manner that the front of the machine, when in operation, rests upon the draft-rod, instead of being carried on the horses' necks.

Figure 1:
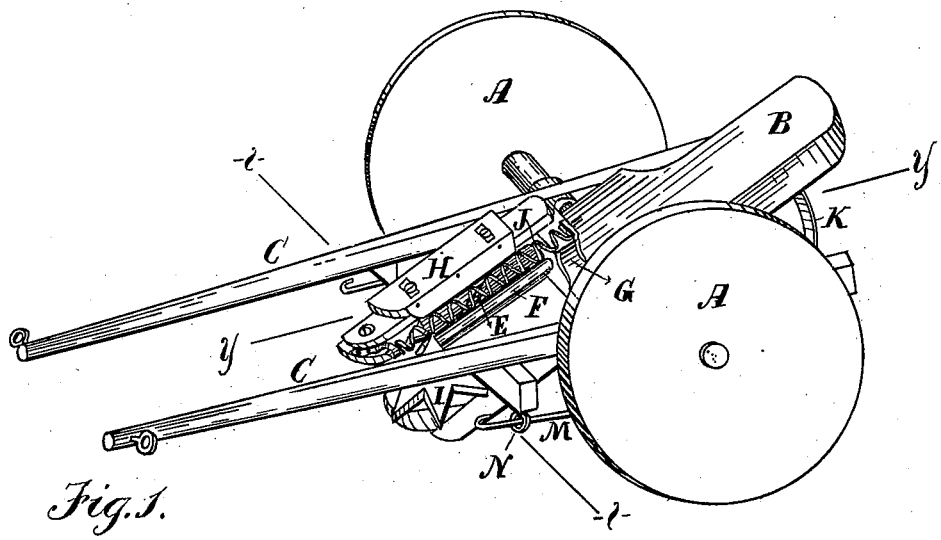
Figure 2:
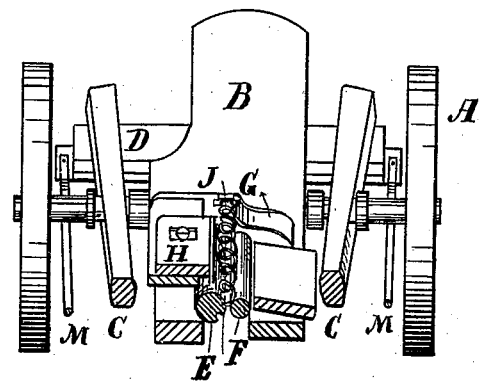
Figure 3:
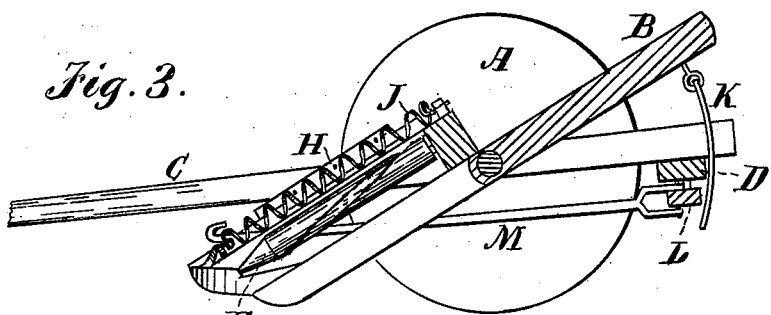

In the accompanying drawings, Figure 1 represents a perspective view of my machine; Fig. 2, a front view, made in section, at the line $x\,x$ in Fig. 1. Fig. 3 is a longitudinal view taken at the line $y\,y$, Fig. 1.

A represents the wheels; B, the pivoted frame, which is pivoted to the axle; and C C are two poles, to which the horses are attached. These poles are also pivoted at the axle, and are connected together at their rear end by a cross-piece, D.

E is a grooved husking-roller, and F is a plain husking-roller. G is a cross-piece, in which these husking-rollers have a bearing. They also have a bearing in the front of the frame B.

H is an adjustable gage or guide board placed over the grooved roller E, and made adjustable laterally, so as to throw the corn over upon the plain roller, and prevent it from being drawn down between the two rollers and shelled while it is being husked. I is a notched gathering-wheel, revolving upon one side of the runner-shaped front of the frame B.

J is a coiled wire, which is revolved to carry the corn-stalks up between the husking-rollers. This elevator has no central shaft, and it therefore receives the corn or stalks through any part of its diameter. It projects forward so that its end is opposite the center of the gathering-wheel, and it therefore co-operates with said wheel in moving the corn to the husking-rollers. The husking-rollers, as well as this spiral elevator, may be driven by gearing in the same manner as shown, or in any other well-known way of transmitting power.

The gathering-wheel I not only assists in gathering the corn-stalks and conveying them to the spiral elevator J and husking-rollers, but also carries the husked ears of corn that fall down before reaching the elevator for elevating the husked corn, which is shown in the patent above referred to, to said elevator. The husked ears of corn fall over the plain roller P as they are husked, and are intended to pass upon an elevator at the side of said roller; but occasionally an ear drops down to the lower end of said roller, and would fall to the ground from the front end of the machine were it not for this revolving wheel I.

K is a brace or supporting piece attached to the rear end of the frame B, and is provided with several holes, by means of which it is adjusted and attached to the cross-piece D. This adjustment turns the frame B upon the axle, and raises or lowers the front end of the machine.

L is an evener attached to the cross-piece D, and M M are draft-rods, to which the horses are attached to draw the machine. These draft-rods are attached to the ends of the evener L, and pass through the eyebolts N at the front of the machine.

It is necessary to have the operative part of my corn-husker extend down quite close to the ground to gather in all of the stalks of the row of corn being harvested. Consequently the front of my machine is much heavier than the part extending back of the axle. This front weight of the machine is also increased when the machine is in operation, because the husking power is used below the axle and in front of it. By arranging the draft as just described, and resting the front of the machine upon the draft-rods M M, this weight is taken from the horses' necks and sustained by the draft-rods M M.

The horses stand, when they are hitched to the machine, so that both of the poles C are between the horses, and the row of corn that is being husked is between the horses, where it is gathered up, carried to the husking-rollers, the ears of corn stripped of their husk, and gathered, as above described, while the corn-stalks and husks pass out from between the rollers and are left in the field. This combination of the draft and the frame of the machine makes a center draft to the machine.

I claim—

1. The combination of the gathering-wheel I and open spiral elevator J, the end whereof is prolonged past the center of said wheel, so as to co-operate with it in moving the corn to the husking-rollers E and F.

2. In combination with the adjustable guide-board H and grooved husking-rollers E and F, the gathering-wheel I and the open spiral elevator J, the front end whereof is prolonged past the center of said wheel, for the purpose set forth.

GEORGE MEADER.

Witnesses:
W. C. CORLIES,
L. A. BUNTING.